Patented Sept. 19, 1922.

1,429,342

UNITED STATES PATENT OFFICE.

ALBIN HALLER, OF PARIS, FRANCE, ASSIGNOR TO FABRIQUES DE PRODUITS CHIMIQUES DE THANN ET DE MULHOUSE, OF THANN, (HAUT-RHIN), FRANCE.

PROCESS OF MANUFACTURING BORNEOL.

No Drawing. Application filed October 18, 1921. Serial No. 508,596.

*To all whom it may concern:*

Be it known that I, ALBIN HALLER, a citizen of the Republic of France, residing in Paris, France, have invented new and useful Improvements in Processes of Manufacturing Borneol, which is fully set forth in the following specification.

In my U. S. Patent 1,415,340, I described and claimed a process of manufacturing borneol, consisting in heating pinene with a tetrachlorophthalic acid in order to obtain the corresponding di-bornyl-ester which is then transformed into borneol by hydrolysis.

The present invention has for its object a process of manufacturing borneol, analogous to said process previously described, but in which new process the acid employed is a tetrahalogenphthalic acid other than the chlorine derivative already proposed.

These tetrahalogenphthalic acids are obtained by four-times substituting a halogen in the phthalic acid, or its isomers, and they are viz: the tetrabromophthalic acids $C_6Br_4(CO_2H_2)$, the tetraiodophthalic acids $C_6I_4(CO_2H_2)$ and the tetrafluorophthalic acids $C_6F_4(CO_2H_2)$.

Obviously I intend to use the halogen derivatives of the ortho- (1:2) acids as well as those of the iso- (1:3) and terephthalic (1:4) acids.

Having now described the nature of my said invention and the best means I know of carrying the same into practical effect, I declare that what I claim is:

1. In a process of manufacturing borneol, producing a reaction between pinene and a tetrahalogenphthalic acid other than the chlorine derivative.

2. In a process of manufacturing borneol, producing a reaction between pinene and a tetrabromophthalic acid.

3. As a new product, di-bornyl ester of a tetrahalogenphthalic acid other than the chlorine derivative.

4. As a new product, di-bornyl ester of a tetrabromophthalic acid.

In testimony whereof I have signed this specification.

ALBIN HALLER.